(12) United States Patent
Stoughton

(10) Patent No.: US 6,270,107 B1
(45) Date of Patent: Aug. 7, 2001

(54) SPRING BIASED TRAILER HITCH SYSTEM

(76) Inventor: Clifford J. Stoughton, Gooderham Komiro Box #277, Gooderham, Ontario (CA), K0M 1R0

( * ) Notice: Subject to any disclaimer, the term of this patent is extended or adjusted under 35 U.S.C. 154(b) by 0 days.

(21) Appl. No.: 09/377,192

(22) Filed: Aug. 19, 1999

(51) Int. Cl.⁷ .................................................. B60D 1/173
(52) U.S. Cl. ........................................... 280/507; 280/511
(58) Field of Search .................................. 280/504, 506, 280/507, 511, 514, 515, 901

(56) References Cited

U.S. PATENT DOCUMENTS

| | | | |
|---|---|---|---|
| 2,697,618 | * 12/1954 | Hulstedt | 280/515 |
| 3,190,677 | * 6/1965 | Robbins | 280/517 |
| 3,257,126 | * 6/1966 | Robertson | 280/511 |
| 3,442,534 | * 5/1969 | McCorkle | 280/511 |
| 3,694,006 | * 9/1972 | Good et al. | 280/507 |
| 5,395,131 | * 3/1995 | Herrick | 280/507 |

* cited by examiner

*Primary Examiner*—Lanna Mai

(57) ABSTRACT

A spring biased trailer hitch system for providing a secure connection between a hitch receiver and a trailer hitch while permitting some spring biased cushioning to the connection to reduce stress on the connection. The spring biased trailer hitch system includes a slotted hitch receiver, a ball hitch having a longitudinal bore, a connection member extending through the bore in the ball hitch, a spring assembly for biasing the connection member, and a connection securement device for coupling the hitch receiver to the ball hitch such that the spring assembly biases the hitch receiver towards the ball hitch.

8 Claims, 3 Drawing Sheets

SPRING BIASED TRAILER HITCH SYSTEM

BACKGROUND OF THE INVENTION

1. Field of the Invention

The present invention relates to trailer hitches and more particularly pertains to a new spring, biased trailer hitch system for providing a secure connection between a hitch receiver and a trailer hitch while permitting some spring biased cushioning to the connection to reduce stress on the connection.

2. Description of the Prior Art

The use of trailer hitches is known in the prior art. More specifically, trailer hitches heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 3,442,534; U.S. Pat. No. 3,694,006; U.S. Pat. No. 4,186,940; U.S. Pat. No. Des. 361,541; U.S. Pat. No. 4,209,184; and U.S. Pat. No. 3,257,126.

While these devices fulfill their respective, particular objectives and requirements, the aforementioned patents do not disclose a new spring biased trailer hitch system. The inventive device includes a slotted hitch receiver, a ball hitch having a longitudinal bore, a connection member extending through the bore in the ball hitch, a spring assembly for biasing the connection member, and a connection securement device for coupling the hitch receiver to the ball hitch such that the spring assembly biases the hitch receiver towards the ball hitch.

In these respects, the spring, biased trailer hitch system according to the present invention substantially departs from the conventional concepts and designs of the prior art, and in so doing provides an apparatus primarily developed for the purpose of providing a secure connection between a hitch receiver and a trailer hitch while permitting some spring biased cushioning to the connection to reduce stress on the connection.

SUMMARY OF THE INVENTION

In view of the foregoing disadvantages inherent in the known types of trailer hitches now present in the prior art, the present invention provides a new spring biased trailer hitch system construction wherein the same can be utilized for providing a secure connection between a hitch receiver and a trailer hitch while permitting some spring biased cushioning to the connection to reduce stress on the connection.

The general purpose of the present invention, which will be described subsequently in greater detail, is to provide a new spring biased trailer hitch system apparatus and method which has many of the advantages of the trailer hitches mentioned heretofore and many novel features that result in a new spring biased trailer hitch system which is not anticipated, rendered obvious, suggested, or even implied by any of the prior art trailer hitches, either alone or in any combination thereof.

To attain this, the present invention generally comprises a slotted hitch receiver, a ball hitch having a longitudinal bore, a connection member extending through the bore in the ball hitch, a spring assembly for biasing the connection member, and a connection securement device for coupling the hitch receiver to the ball hitch such that the spring assembly biases the hitch receiver towards the ball hitch.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new spring biased trailer hitch system apparatus and method which has many of the advantages of the trailer hitches mentioned heretofore and many novel features that result in a new spring biased trailer hitch system which is not anticipated, rendered obvious, suggested, or even implied by any of the prior art trailer hitches, either alone or in any combination thereof.

It is another object of the present invention to provide a new spring biased trailer hitch system that may be easily and efficiently manufactured and marketed.

It is a further object of the present invention to provide a new spring biased trailer hitch system that is of a durable and reliable construction.

An even further object of the present invention is to provide a new spring biased trailer hitch system which is susceptible of a low cost of manufacture with regard to both materials and labor, and which accordingly is then susceptible of low prices of sale to the consuming public, thereby making such spring biased trailer hitch system economically available to the buying public.

Still yet another object of the present invention is to provide a new spring, biased trailer hitch system which provides in the apparatuses and methods of the prior art some of the advantages thereof, while simultaneously overcoming some of the disadvantages normally associated therewith.

Still another object of the present invention is to provide a new spring biased trailer hitch system for providing a secure connection between a hitch receiver and a trailer hitch while permitting some spring biased cushioning to the connection to reduce stress on the connection.

Yet another object of the present invention is to provide a new spring biased trailer hitch system which includes a slotted hitch receiver, a ball hitch having a longitudinal bore, a connection member extending through the bore in the ball hitch, a spring assembly for biasing the connection member, and a connection securement device for coupling the hitch receiver to the ball hitch such that the spring assembly biases the hitch receiver towards the ball hitch.

Still yet another object of the present invention is to provide a new spring biased trailer hitch system that permits some free play between the hitch receiver and the ball hitch to reduce stress on the connection between the hitch receiver and the ball hitch.

Even still another object of the present invention is to provide a new spring biased trailer hitch system that biases a hitch receiver onto a ball hitch to prevent the hitch receiver from uncoupling from the ball hitch.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
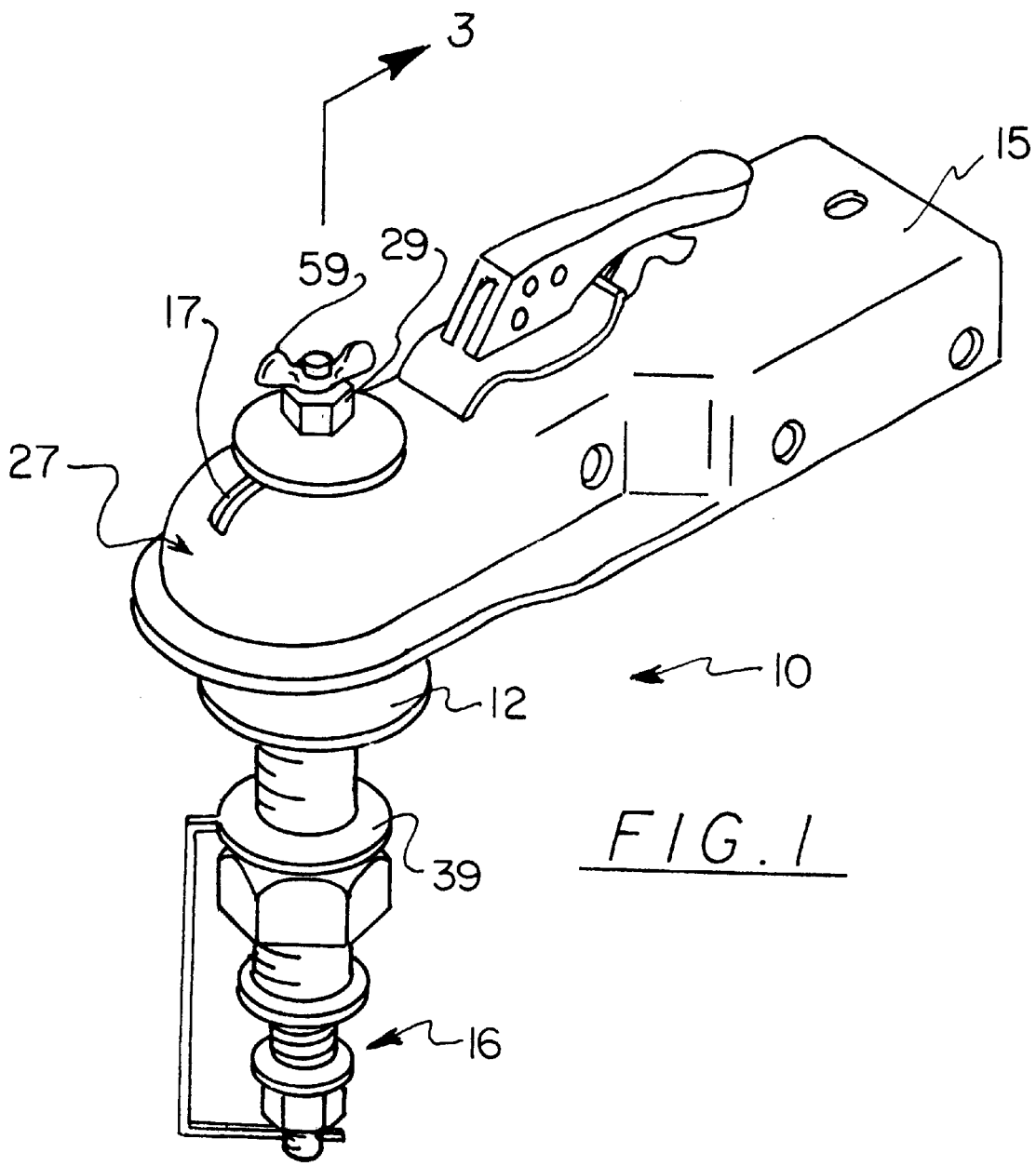
FIG. 1 is a perspective view of a new spring biased trailer hitch system according to the present invention.
Figure 2:
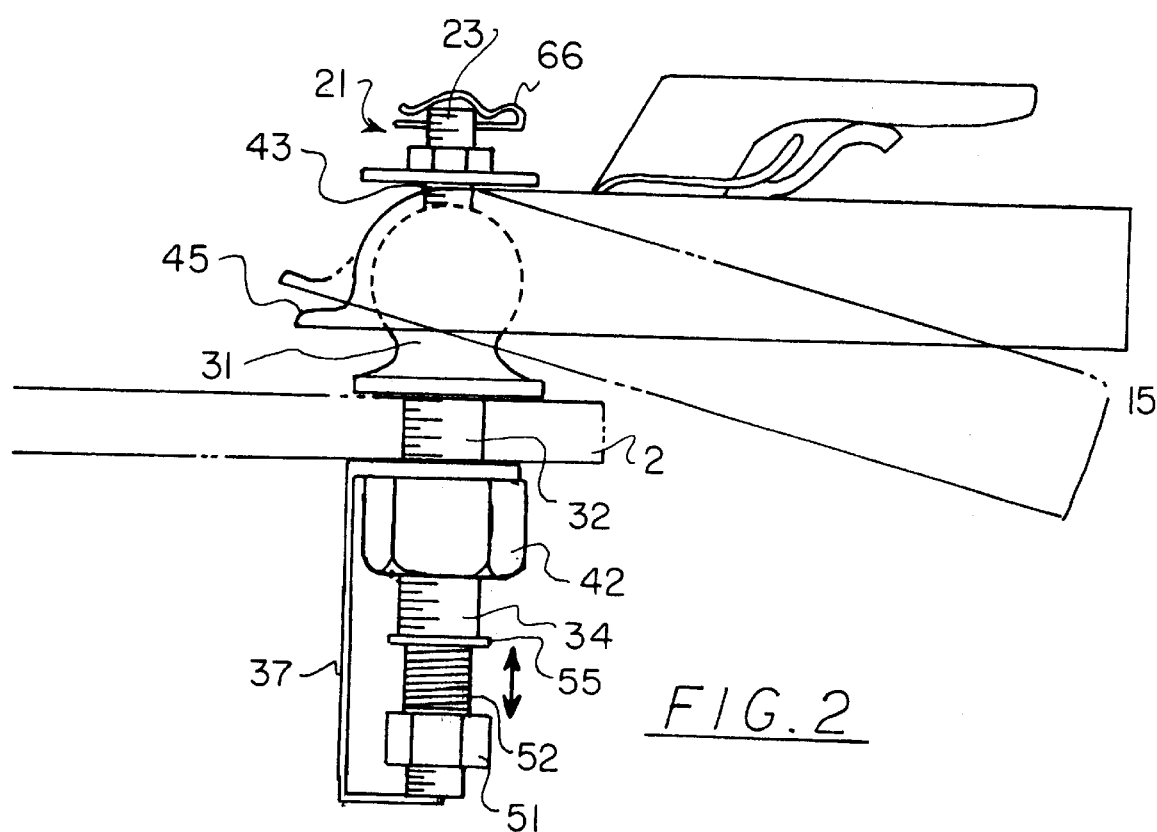
FIG. 2 is a side view of the present invention.
Figure 3:
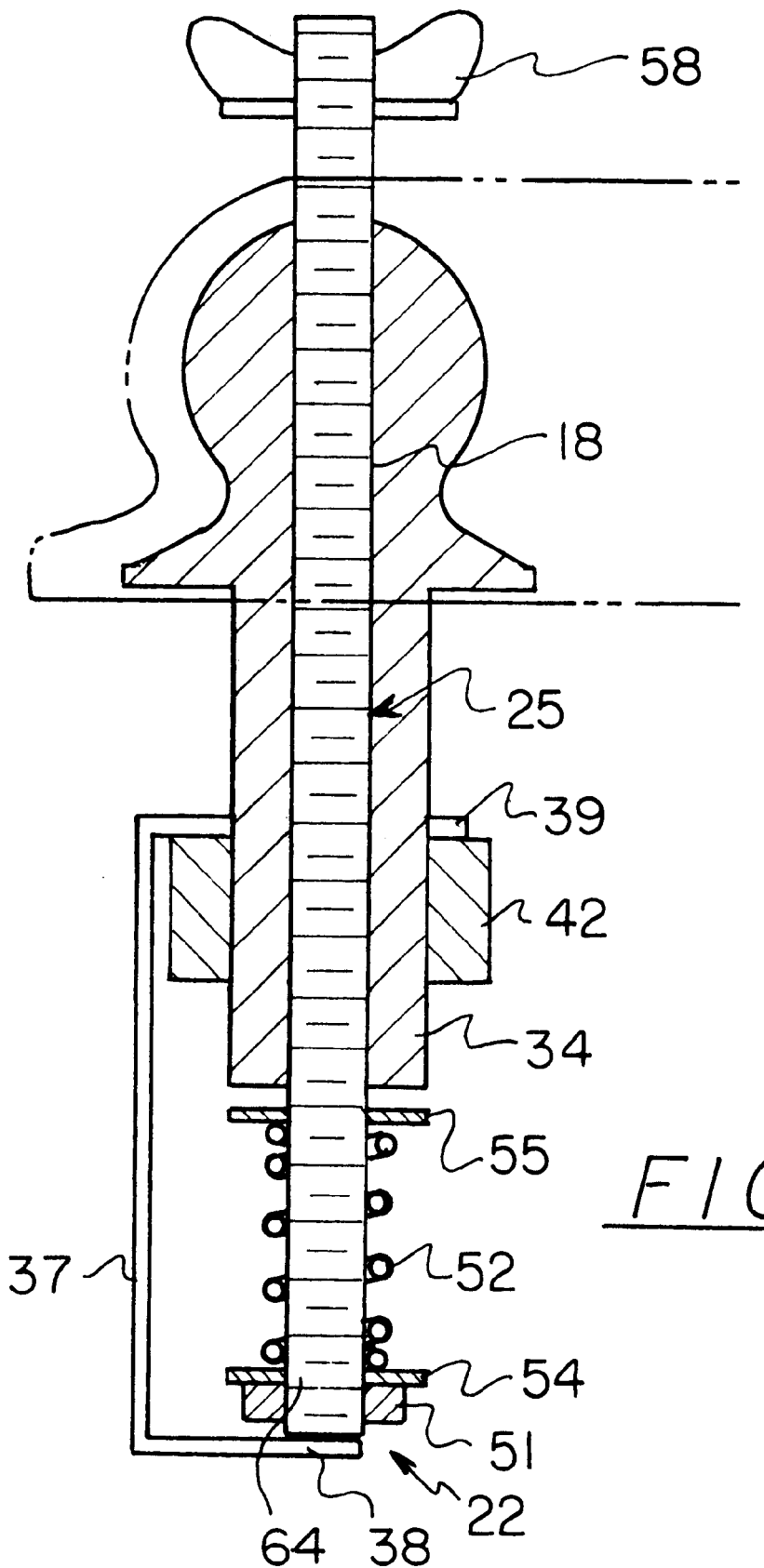
FIG. 3 is a cross-sectional view of the present invention taken along line 3—3 of FIG. 1.

With reference now to the drawings, and in particular to FIGS. 1 through 3 thereof, a new spring biased trailer hitch system embodying the principles and concepts of the present invention and generally designated by the reference numeral 10 will be described.

As best illustrated in FIGS. 1 through 3, the spring biased trailer hitch system 10 generally comprises a hitch member 12, an elongate rod 14, a hitch receiver 15 having a slot 17, and a spring assembly 16. The hitch member includes a bore 18 that extends through the hitch member. The hitch member is designed for coupling to a hitch mounting arm of a towing vehicle. In an embodiment, the hitch member includes a longitudinal axis and the bore extends along the longitudinal axis of the hitch member.

The elongate rod includes a first end 21 and a second end 22. The first end is opposite the second end and the first end includes a threaded portion 23. The second end includes a second threaded portion 64. In an embodiment, the full length of the rod may be threaded provided the rod is slidably passable through the bore of the hitch member. In an embodiment, the inner walls 25 of the bore are generally smooth to permit the rod to move freely within the bore.

The hitch receiver includes a receiving portion 27 for receiving a portion of the hitch member. The receiving portion is structured such that slot 17 extends through the receiving portion. The slot is structured for receiving the first end of the rod therethrough. A hitch nut 29 is provided for securing to the threaded portion of the first end of the rod. In an embodiment, the slot 17 extends from a top 43 of the hitch receiver towards a distal end 45 of the hitch receiver. The slot is designed to extend along a direction of travel of the vehicle such that the rod slides along a length of the slot when a front of the vehicle tilts downwardly relative to the hitch receiver.

The spring assembly is couplable to the second end of the rod whereby the hitch receiver is coupled between the hitch nut and the hitch member. The spring assembly is designed for biasing the first end of the connection member towards the hitch member. Thus the spring assembly is designed to cushion movement of the hitch receiver relative to the hitch member.

In an embodiment, the hitch member includes an upper portion 31 and a lower portion 32. The lower portion of the hitch member is threaded to engage a threaded hole through the hitch mounting arm 2 of a vehicle. The lower portion of the hitch member is designed for coupling to the trailer hitch mounting arm of a vehicle such that a lower extent 34 of the lower portion extends below the trailer hitch mounting arm.

In an embodiment, a rod retainer 37 is coupled to the lower extent of the hitch member. The rod retainer includes a support portion 38 positionable beneath the second end of the rod whereby the rod is prevented from sliding out of the bore in the hitch member. The rod retainer includes a substantially annular top portion 39. The lower extent of the hitch member passes through the annular top portion of the rod retainer and the support portion is positioned below the rod. A rod retainer nut 42 is coupled to the lower extent of the hitch member such that the annular top portion of the rod retainer is positioned between the rod retainer nut and the upper portion of the hitch member whereby the rod retainer is coupled to the hitch member. When installed on the trailer mounting arm, the annular top portion of the rod retainer is positioned between the trailer hitch mounting arm and the rod retainer nut.

The spring assembly includes a spring retainer nut 51 and a cylindrical spring member 52. The spring retainer nut is coupled to the second end of the rod. The rod passes though the spring member with the spring member positioned between the spring retainer nut and the hitch member.

In an embodiment, the spring assembly also includes a first washer 54 and a second washer 55. The rod passes through the first washer, which is positioned between the spring retainer nut and the spring member. The rod passes through the second washer, which is positioned between the hitch member and the spring member.

In an embodiment, a wing nut 58 is used for the hitch nut to permit hand tightening of the hitch nut. The first end of the rod includes an aperture 59 extending through the rod perpendicular to a longitudinal axis of the rod. A cotter pin 66 is extended through the aperture in the rod so that the wing nut is prevented from coming loose from the first end of the rod while the cotter pin is inserted through the aperture.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing, is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A trailer hitch system for connecting a towing vehicle to a trailer, the system comprising:

a hitch member having a bore extending through said hitch member, said hitch member being adapted for coupling to a hitch mounting arm of the towing vehicle;

an elongate rod having a first end and a second end, the first end being opposite the second end, said first end having a threaded portion, said rod being slidably passable through said bore of said hitch member;

a hitch receiver having a receiving portion for receiving a portion of said hitch member, said receiving portion being structured to have a slot extending therethrough, said slot being structured for receiving said first end of said rod therethrough;

a hitch nut for securing to said threaded portion of said first end of said rod;

a spring assembly couplable to said second end of said rod whereby said hitch receiver is coupled between said hitch nut and said hitch member, said spring assembly being for biasing said first end of said rod towards said hitch member;

said hitch member having an upper portion and a lower portion, said lower portion of said hitch member being threaded, said lower portion of said hitch member being adapted for coupling to the trailer hitch mounting arm of a vehicle such that a lower extent of the lower portion extends below the trailer hitch mounting arm; and a rod retainer being coupled to the lower extend of the hitch member, the rod retainer having a support portion positionable beneath said second end of said rod.

2. The trailer hitch system of claim 1, further comprising:

said rod retainer having a substantially annular top portion, said lower extend of said hitch member passing through said annular top portion of said rod retainer; and a rod retainer nut coupled to said lower extend of said hitch member such that said annular top portion of said rod retainer is positioned between said rod retainer nut and said upper portion of said hitch member whereby said rod retainer is coupled to said hitch member.

3. The trailer hitch system of claim 1, further comprising:

said hitch member having a longitudinal axis, said bore extending along said longitudinal axis of said hitch member.

4. The trailer hitch system of claim 1, further comprising:

said slot extending from a top of said hitch receiver towards a distal end of said hitch receiver, said slot being adapted to extend along a direction of travel of the vehicle such that said rod slides along a length of said slot when a front of the vehicle tilts downwardly relative to the hitch receiver.

5. The trailer hitch system of claim 1, further comprising:

said spring assembly having a spring retainer nut and a cylindrical spring member, said spring retainer nut being coupled to said second end of said rod, said rod passing through said spring member, said spring member being positioned between said spring retainer nut and said hitch member.

6. The trailer hitch system of claim 5, further comprising:

a first washer and a second washer, said rod passing through said first washer, said first washer being positioned between said spring retainer nut and said spring member; and said rod passing through said second washer, and second washer being positioned between said hitch member and said spring member.

7. The trailer hitch system of claim 1, further comprising:

said hitch nut being a wing nut;

said first end of said rod having an aperture extending through said rod perpendicular to a longitudinal axis of said rod; and a cotter pin, said cotter pin being extendable through said aperture in said rod whereby said wing nut is prevented from coming loose from said first end of said rod while said cotter pint is inserted through said aperture.

8. A trailer hitch system for connecting a towing vehicle to a trailer, the system comprising:

a hitch member having a bore extending through said hitch member, said hitch member being adapted for coupling to a hitch mounting arm of the towing vehicle;

an elongate rod having a first end and a second end, the first end being opposite the second end, said first end having a threaded portion, said rod being slidably passable through said bore of said hitch member;

a hitch receiver having a receiving portion for receiving a portion of said hitch member, said receiving portion being structured to have a slot extending therethrough, said slot being structured for receiving said first end of said rod therethrough;

a hitch nut for securing to said threaded portion of said first end of said rod;

a spring assembly couplable to said second end of said rod whereby said hitch receiver is coupled between said hitch nut and said hitch member, said spring assembly being for biasing said first end of said rod towards said hitch member;

said hitch member having an upper portion and a lower portion, said lower portion of said hitch member being threaded, said lower portion of said hitch member being adapted for coupling to the trailer hitch mounting arm of a vehicle such that a lower extent of the lower portion extends below the trailer hitch mounting arm;

a rod retainer being coupled to the lower extent of the hitch member, the rod retainer having a support portion positionable beneath said second end of said rod;

said rod retainer having a substantially annular top portion, said lower extent of said hitch member passing through said annular top portion of said rod retainer;

a rod retainer nut coupled to said lower extent of said hitch member such that said annular top portion of said rod retainer is positioned between said rod retainer nut and said upper portion of said hitch member whereby said rod retainer is coupled to said hitch member;

said hitch member having a longtitudinal axis, said bore extending along said longitudinal axis of said hitch member;

said slot extending from a top of said hitch receiver towards a distal end of said hitch receiver, said slot being adapted to extend along a direction of travel of the vehicle such that said rod slides along a length of said slot when a front of the vehicle tilts downwardly relative to the hitch receiver;

said spring assembly having a spring retainer nut and a cylindrical spring member, said spring retainer nut being coupled to said second end of said rod, said rod passing through said spring member, said spring member being positioned between said spring retainer nut and said hitch member;

a first washer and a second washer, said rod passing through said first washer, said first washer being positioned between said spring retainer nut and said spring member;

said rod passing through said second washer, said second washer being positioned between said hitch member and said spring member;

said hitch nut being a wing nut;

said first end of said rod having an aperature extending through said rod perpendicular to a longtitudinal axis of said rod; and a cotter pin, said cotter pin being extendable through said aperture in said rod whereby said wing nut is prevented from coming loose from said first end of said rod while said cotter pin is inserted through said aperture.

\* \* \* \* \*